(12) United States Patent
Joseph

(10) Patent No.: US 7,529,824 B2
(45) Date of Patent: May 5, 2009

(54) METHOD FOR SELECTING A SERVICE BINDING PROTOCOL IN A SERVICE-ORIENTED ARCHITECTURE

(75) Inventor: Joshy Joseph, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 10/684,869

(22) Filed: Oct. 14, 2003

(65) Prior Publication Data
US 2005/0080873 A1 Apr. 14, 2005

(51) Int. Cl.
*G06F 15/173* (2006.01)
(52) U.S. Cl. .................. 709/223; 709/203; 709/230
(58) Field of Classification Search ........... 709/206, 709/223, 226, 201–203, 216–219, 227–231
See application file for complete search history.

(56) References Cited

U.S. PATENT DOCUMENTS

| | | | | |
|---|---|---|---|---|
| 6,401,099 | B1 * | 6/2002 | Koppolu et al. | 707/103 R |
| 6,658,469 | B1 * | 12/2003 | Massa et al. | 709/224 |
| 7,212,809 | B2 * | 5/2007 | Khawand | 455/414.1 |
| 2002/0046157 | A1 | 4/2002 | Solomon | 705/37 |
| 2002/0082875 | A1 | 6/2002 | Best-Devereux | 705/4 |
| 2002/0087613 | A1 | 7/2002 | Harif | 709/104 |
| 2002/0087881 | A1 | 7/2002 | Harif | 713/201 |
| 2002/0120749 | A1 | 8/2002 | Widegren et al. | 709/227 |
| 2002/0128837 | A1 | 9/2002 | Morin | 704/255 |
| 2002/0143819 | A1 * | 10/2002 | Han et al. | 707/513 |
| 2002/0147828 | A1 | 10/2002 | Chen et al. | 709/231 |
| 2002/0152299 | A1 | 10/2002 | Traversat et al. | 709/223 |
| 2002/0169889 | A1 | 11/2002 | Yang et al. | 709/244 |
| 2002/0178214 | A1 * | 11/2002 | Brittenham et al. | 709/203 |
| 2003/0204622 | A1 * | 10/2003 | Blizniak et al. | 709/241 |
| 2004/0003033 | A1 * | 1/2004 | Kamen et al. | 709/203 |
| 2004/0116117 | A1 * | 6/2004 | Ahvonen et al. | 455/432.3 |
| 2004/0122926 | A1 * | 6/2004 | Moore et al. | 709/223 |

(Continued)

FOREIGN PATENT DOCUMENTS

CN 1402494 A 3/2003

OTHER PUBLICATIONS

Nilo Mitra, SOAP Version 1.2 Part0: Primer, Dec. 2001, W3C, Version 1.2.*

(Continued)

*Primary Examiner*—Yasin M Barqadle
(74) *Attorney, Agent, or Firm*—William A. Kinnaman, Jr.

(57) ABSTRACT

A method and apparatus for invoking a service in a service-oriented architecture in which a client invokes such service from a service provider using a selected transport binding. A service binding for a service invocation from the service provider is first negotiated in a negotiation process using a first transport binding. The service invocation is then handled using the service binding negotiated in the negotiation process. A client may first determine whether a server is capable of negotiating a service binding. If the server is capable of negotiating a service binding, the client negotiates a service binding with the server. Otherwise, a service binding is selected on the basis on diagnostic information available to the client without negotiating with the server. Separate service bindings may be negotiated for each of several portions of a communication path, either by the client and service provider or by intermediaries along the communication path.

4 Claims, 6 Drawing Sheets

U.S. PATENT DOCUMENTS

2004/0199636 A1* 10/2004 Brown et al. ............. 709/227

OTHER PUBLICATIONS

Liu, J.; Lu, Y., "Persistent Data Storage for Metadata Related to Web Service Entities", U.S. Appl. No. 10/670,425, filed Sep. 24, 2003.

Nakajima, T. "Explicit Biding Interface for Supporting Native ATM Networks in A CORBA," Proceedings Seventh International Conference on Real-Time Computing System and Applications, pp. 199-206.

* cited by examiner

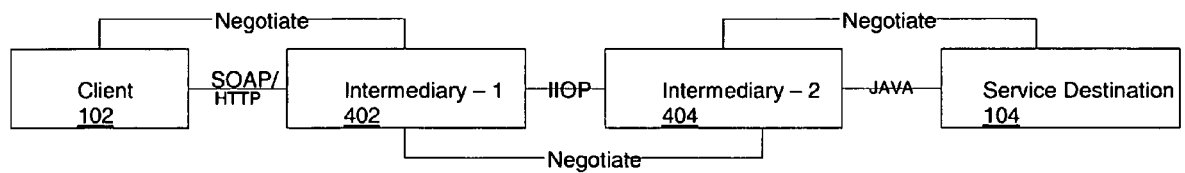
Fig. 4
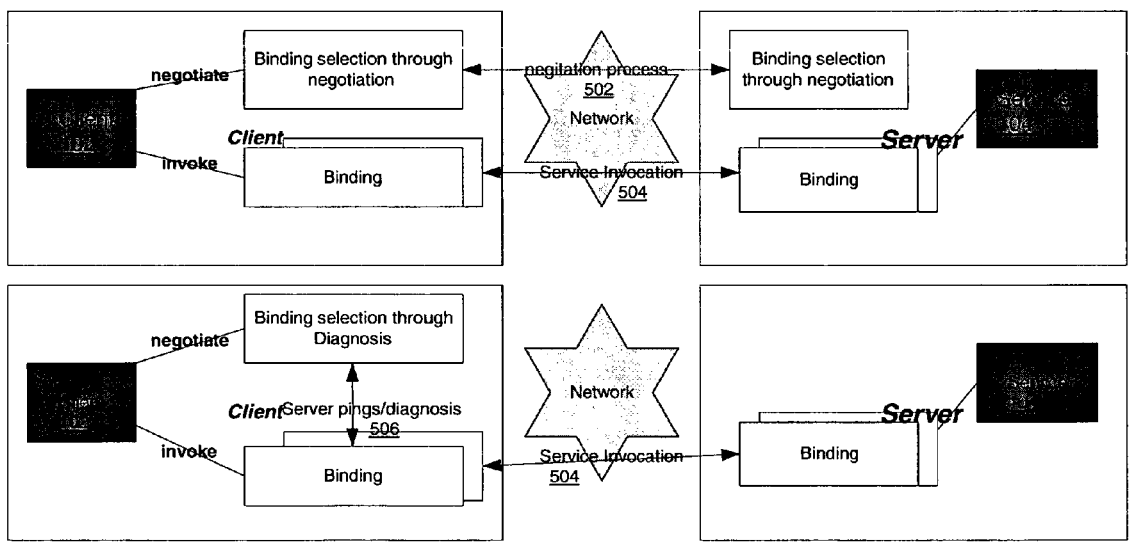
Fig. 5A
Fig. 5B

METHOD FOR SELECTING A SERVICE BINDING PROTOCOL IN A SERVICE-ORIENTED ARCHITECTURE

BACKGROUND OF THE INVENTION

1. Field of the Invention

This invention relates to a method and apparatus for selecting a service binding protocol in a service-oriented architecture in which a client invokes a service from a service provider using a selected transport binding. More particularly, it relates to a method and apparatus for selecting such a service binding protocol through negotiation and diagnosis.

2. Description of the Related Art

Reference may be made in this specification (using bracketed numbers) to the Publications listed in Appendix B, available either in printed form or online and incorporated herein by reference.

One of the more significant events in the field of information technology in the last several years has been the development of specifications and implementations of Web services and its close kin, Grid services. As described in reference [2] at page 7, "Web services are self-contained, modular applications that can be described, published, located, and invoked over a network. Web services perform encapsulated business functions, ranging from simple request-reply to full business process interactions." Web services have been codified in such standards specifications as the Web Services Description Language (WSDL) [1]. Grid services [10, 11] have been defined as Web services that conform to a set of conventions (interfaces and behaviors) that define how a client interacts with a grid service. Grid services have been used to create virtual organizations (VOs) in which available computing resources (applications, processors, etc.) that are actually located remotely appear as local resources to a user.

In a service-oriented architecture such as Web services, a service provider can provide a number of transport protocols used for binding to access a service. This is done in order to provide better quality-of-service (QOS) features for the clients. One example of this binding is a transport binding for a service using IIOP instead of SOAP/HTTP for better performance. (For these and other acronyms, see the glossary in Appendix A below. SOAP is described in more detail in references 3-6 and 12 of Appendix B.) The service provider defines this binding information in a WSDL document at the time of the service deployment and initiates the server-side framework (stubs/JMS listener etc.) to support those bindings. The service skeletons are created to handle incoming requests in a binding-specific manner and convert the incoming requests to the platform-specific service invocation model. There can be a number of binding protocol models (SOAP/HTTP, IPC, IIOP, RMI, SOAP/JMS etc.) that can be created based on such criteria as performance, interoperability, service container capabilities and QOS requirements. The client who uses the service can get hold of the WSDL document for the service from some registries (UDDI) or from the service itself (through HTTP GET) and evaluate the WSDL document. The client can generate static stubs or can dynamically introspect the WSDL document for the service invocation. This results in a client with a number of transport-protocol binding information proxies, from which the client needs to select one to invoke the service.

FIG. 1 is a concept map showing the relationships between a client 102, a service 104 (also referred to herein as a "service provider"), various bindings 106, and a WSDL document 108. As shown in the figure, a client 102 uses the WSDL document 108 to generate a service binding 106, and the client 102 invokes the service 104 (by issuing a service request) using the generated binding 106. Service 104 in turn uses the selected binding 106.

As shown in FIG. 1, now the client faces a major problem about which binding to select to achieve the QOS characteristics it needs. The service provider assumes that the client is capable of making intelligent decisions on the protocol binding selection based on its needs on QOS requirements such as performance and throughput, platform capability and configuration. Today, this approach can provide some static information models and binding selection preferences through WSDL extensions and binding ordering. But for a client this is not enough to make intelligent decisions on binding selection.

There are current efforts to provide a client with a more elaborate information model on the service protocol binding. Thus, a client can select a binding based on (1) WSDL binding extensibility information and binding selection policies (service level agreements and policies); (2) client configuration and deployment policies, including static deployment options and service level agreement (SLA) requirements as well as dynamic polices and SLA requirements (programming model configuration, policies etc); (3) machine-interpretable semantic information associated with the client through WSDL extensions for RDF; and (4) automatically imposed binding rules like order of binding. Additionally, or alternatively, this may be effected through service provider policies such as service-provided deployment policies (e.g., expose only certain bindings at some point in time) or having a server provide polices through SLA, UDDI etc.

These efforts, however, are merely extensions to the existing WSDL description and programming model and do not address the dynamic configuration needs for a client at runtime through a dynamic handshaking (negotiation) process. Similarly, WSIF (Web Service Invocation Framework) is a framework provided to create a multi-binding channel at the client side based on the static information from the WSDL files.

Also, there are several problems with the solutions mentioned above. They require a prior knowledge of the transport binding selection on the client and server side. Most of the requirements for QOS must be known beforehand and need to be configured before service invocation. They are very static in nature, with little flexibility. They depend on a number of tools, based on the different service provider requirements. Their ability to support intermediaries is very limited, as is their ability to dynamically change a binding for some specific QOS requirement. Finally, they are not able to enter into a conversation with the server on transport binding selection, which would result in better QOS controls.

What is needed, therefore, is a mechanism for a dynamic transport binding selection.

SUMMARY OF THE INVENTION

In general, the present invention contemplates a method and apparatus for invoking a service in a service-oriented architecture in which a client invokes such service from a service provider using a selected transport binding. A service binding for a service invocation from the service provider is first negotiated in a negotiation process using a first transport binding. The service invocation is then handled using the service binding negotiated in the negotiation process.

A client may first determine whether a server is capable of negotiating a service binding, for example by "pinging" the server. If the server is capable of negotiating a service binding, the client negotiates a service binding with the server. Otherwise, a service binding is selected on the basis on information (such as diagnostic information) available to the client without negotiating with the server.

Separate service bindings may be negotiated for each of several portions of a communication path, either by the client and service provider or by intermediaries along the communication path.

The present invention thus contemplates a handshaking protocol between a client and a service for a proper transport binding selection at runtime in order to get better performance and throughput in a service-oriented architecture. The client can achieve the desired QOS requirements through the negotiation with the server using the negotiation protocol of the present invention. In the case where the negotiation protocol is not supported, the client can achieve the desired QOS requirements through some diagnostic decision-making process using diagnostic benchmarking utilities.

The present invention does not address service-specific binding requirements to achieve certain QOS features. This includes binding addressing scheme, message format, encoding, message style (DOC/RPC), invocation model and other binding-specific QOS (co-relation, transaction and security etc). In addition, the present invention imposes no programmatic definition on binding usage. The client-side framework selects these bindings, and clients are independent of this binding selection. An implementation can be a WSIF framework (provides a number of bindings for Web services) that can be used along with a JAX-RPC handler (binding selector) for Web service binding selection. (JAX-RPC is described in more detail reference 9 of Appendix B.)

The invention may be implemented in hardware or as a combination of hardware and software. When implemented as a combination of hardware and software, the software part of the combination may take the form of a program storage device (such as a magnetic or optical disk or semiconductor memory) readable by a machine, tangibly embodying a program of instructions executable by the machine to perform defined method steps.

BRIEF DESCRIPTION OF THE DRAWINGS

FIG. 4 shows a special case where the intermediaries are involved in a negotiation process.

FIG. 5A shows service binding selection through negotiation.

FIG. 5B shows service binding selection through diagnosis.

DESCRIPTION OF THE PREFERRED EMBODIMENTS

As a preliminary to a detailed discussion of preferred embodiments, several possible network topologies will be described. In the summary description above, the client and service provider were assumed to communicate directly with each other, without any intermediaries, and use only one service binding over the entire communication path. In an actual implementation, however, different service bindings may be negotiated for different portions of the communication path, and intermediaries may be involved either passively or actively in the negotiation process. In the use case scenarios described below, the following is assumed:

1. A service provider can deploy a service in a container with protocol binding for HTTP, JMS, IIOP.
2. The client can use the service through an HTTP binding if there is no need for a reliable messaging.
3. The client can use the service through a JMS binding if there is a need for reliable messaging.
4. If the client is deployed along with the service in the same container he can use IIOP for the best performance.

Figure 1:
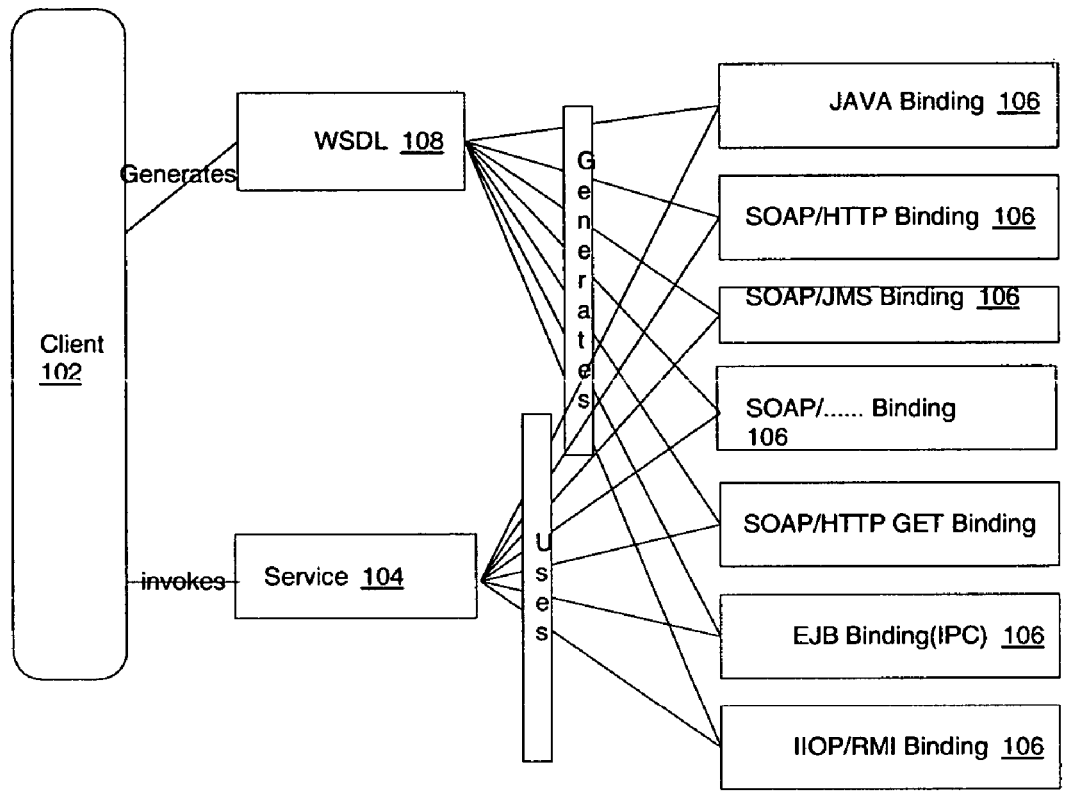
FIG. 1 is a concept map showing the relationships between a client, a service, various bindings, and a WSDL document.
Figure 2:
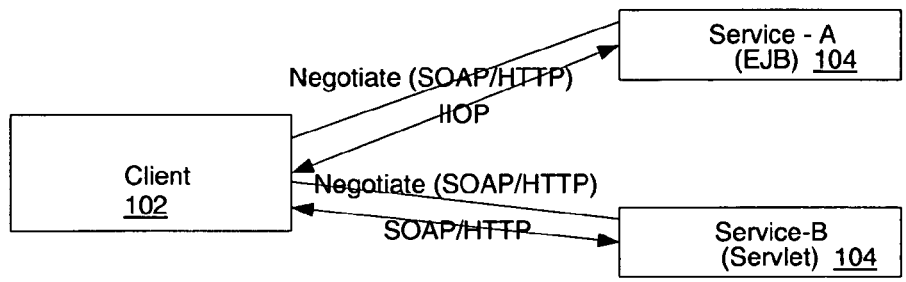
FIG. 2 shows a scenario in which a client invokes two services using different bindings.

A client can be directly involved in a negotiation with the server (service provider) for an appropriate transport binding selection. Once a transport binding is selected, the client uses that for the next level of communication. FIG. 2 shows a first scenario (use case 1) in which a client 102 invokes two different services 104 (services A and B) using different bindings (IIOP and SOAP/HTTP) for service invocation. More particularly, for each of the services 104, the client 102 first negotiates a service binding in a negotiation process (the upper link of each pair of links in the figure) using a first, non-negotiated transport binding for the negotiation process. In the example shown, the transport binding used for the negotiation process is SOAP/HTTP. However, the invention is not limited to this binding, and other bindings could be used instead. The negotiation may center on quality-of-service (QOS) features or any other aspect of the transport binding of interest to the negotiating parties.

After negotiating a transport binding for use with a particular service provider 104, the client 102 then invokes a service from the service provider in a service invocation (the lower link of each pair of links in the figure) using the transport binding that was negotiated. In this particular example, the client 102 has negotiated an IIOP transport binding with service A and a SOAP/HTTP binding with service B. Note that for service B, the same transport binding (SOAP/HTTP) is used for the service invocation as for the negotiation process. In general, however, there is no relationship between the bindings used for the negotiation process and for the service invocation (other than that they are supported by the parties to the negotiation process and service invocation).

In the various figures, client 102 may be one of a plurality of such clients (or "service requesters") on a client machine not separately shown. Similarly, service provider 104 may be one of a plurality of such service providers on a server machine (or "server"). Except as described herein, the particulars of the operation of client 102 and service provider 104 form no part of the present invention and are therefore not shown. Likewise, the particulars of the operation of the machines on which the client 102 and service provider 104 reside form no part of the present invention, and these machines are therefore not separately shown. Similarly, aside from being able to support the protocols described herein, the particulars of the operation of the network connecting the client 102 and the service provider 104 form no part of the invention and are therefore not described.

Figure 3:
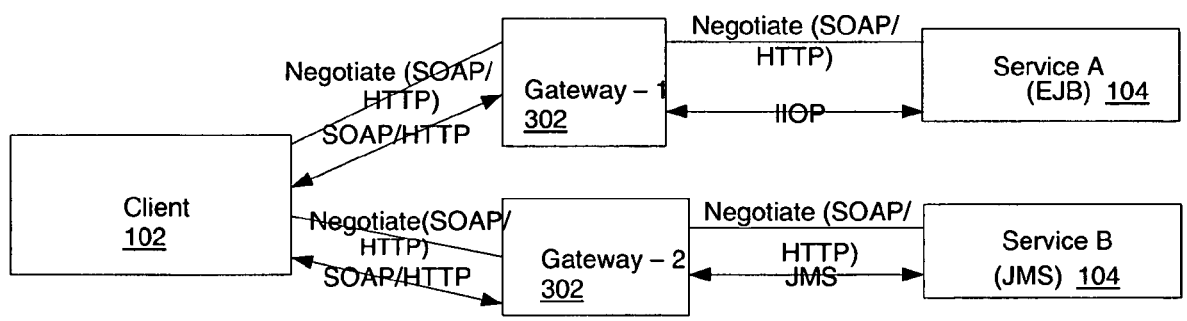
FIG. 3 shows a scenario in which client interacts with a gateway and the gateway interacts with the services using custom binding protocols.

In the previous scenario, the parties to a particular negotiation process were the client and a service provider, which dealt with each other directly. FIG. 3 shows a second scenario (use case 2) in which a client 102 interacts with gateways 302 and the gateways 302 interact with respective services 104 using individual binding protocols. In the scenario shown in FIG. 3, the SOAP/HTTP binding is used for each negotiation process, as before. However, for the service invocation from service A, the SOAP/HTTP binding is used for the communication path between the client 102 and the gateway 302, while the IIOP binding is used for the communication path between the gateway 302 and the service 104. Similarly, for the service invocation from service B, the SOAP/HTTP binding is used for the communication path between the client 102 and the gateway 302, while the JMS binding is used for the communication path between the gateway 302 and the service 104.

In the scenario shown in FIG. 3, a gateway 302 can be involved in a negotiation with the service provider 104 for an appropriate transport binding selection. Once a transport binding is selected, the gateway 302 uses that for the next level of communication to the service 104, the service invocation. The client 102 can also get involved in this binding negotiation process and can show its interest in a specific binding selection and negotiation process. Also, at runtime a client 102 can influence a gateway 302 with its QOS requirements through the binding selection through negotiation protocol of the present invention.

In the FIG. 3 scenario, the client 102 and the service 104 may negotiate a transport binding for each leg of the communication path between them, with the gateway 302 acting as a broker for the negotiations. Alternatively, the gateway 302 may act as a principal and negotiate for itself bindings with the client 102 and the service 104. Stated another way, between a client 102 and a particular service 104, there may one negotiation process (between the client and the service) or two (between the client and the gateway and between the gateway and the service). Either alternative is possible, based on the gateway functionality (i.e., whether it is an intelligent agent or a simple broker).

FIG. 4 shows yet a third scenario, a special case where intermediaries are involved in a negotiation process. (As for the distinction between an "intermediary" and a "gateway", a gateway normally has more functionality—such as message processing, dispatching and routing—than an intermediary, which is normally a message router to a destination.) This can be achieved by the transport binding selection protocol of the present invention in conjunction with related routing protocols. Once the negotiation is finished, a suitable binding protocol is selected across the intermediaries using different binding channels. More particularly, in the scenario shown in FIG. 4, client 102 communicates with service 104 through first and second intermediaries 402 and 404 in the communication path between the client 102 and the service 104. Although two intermediaries 402 and 404 are shown in this particular example, more intermediaries or only a single intermediary could be involved instead.

In the scenario shown in FIG. 4, each pair of adjacent nodes enters into a separate negotiation process, using the SOAP/HTTP binding for this purpose as before. For the actual service invocation, however, the transport binding used between a particular pair of nodes depends on the results of the negotiation between the two nodes. Thus, in the FIG. 4 example, the service invocation uses a SOAP/HTTP transport binding between the client 102 and the first intermediary 402, an IIOP binding between the first intermediary 402 and the second intermediary 404, and a JMS binding between the second intermediary 404 and the service 104.

The present invention contemplates two mechanisms for service binding selection: (1) service binding selection through negotiation; and (2) service binding selection through a diagnostic process.

The first mechanism is a negotiation process between the client and the server using a defined negotiation protocol, also referred to herein as a "service binding selection through negotiation" (SBSN) protocol. Normally a WSDL document defining a service provides the necessary information about the transport bindings available, so that a client can talk to that service. The client creates a number of client-side bindings from which it can choose the best one based on its requirements. At runtime it can initiate a negotiation process with the server and then based on that the client can select a protocol binding that matches the requirements. Once this binding selection is done, runtime binding protocols like WSIF or others can be used for communicating with the service.

A SOAP header-based model may be used for negotiation to enable message routing across intermediaries, to enable a common profile for the negotiation protocol, and to support various client and service implementations. Such a SOAP header may carry binding-related information on the message call, while information on service profiles (e.g., client/service container properties, custom user-defined properties, class loader information) may be carried along with a SOAP message as one or more attachments [12].

Service binding selection through negotiation works as follows. At runtime, the client and the server enter into a negotiation process based on their QOS requirements and their capabilities. These QOS requirements include better performance, throughput and scalability. FIG. 5A shows the basic scheme. Client 102 and service 104, using a first transport binding such as SOAP/HTTP, enter into a negotiation process 502 with each other over the network to negotiate a transport binding to be used for a service invocation from the service provider 104. Client 102 then uses the negotiated transport binding (which may be the same as or different from the first transport binding) in a service invocation 504 to invoke a service from the service provider 104.

The second mechanism is used in the case where the service provider does not support a transport binding negotiation framework. Here, a process is based on a dynamic profile information collection based on server "pings" (sending abstract messages to the server using the available bindings), message correlation (collecting error messages, logs) and interpretation (correlating the messages, logs and time of invocation) based on the event correlation process. Based on this profile, the client can make some decisions on the binding to select.

FIG. 5B shows the general scheme for service binding selection through diagnosis. The scheme shown in FIG. 5B is generally similar to that shown in FIG. 5A, except that instead of negotiating a service binding with the service provider, the client selects a binding through a selection process 506 that is based upon information available locally, such as diagnostic information of the type described below.

In a preferred embodiment, in order to support a conversation between a client and server regarding service binding selection, the following are provided: (1) a negotiation protocol; (2) a binding framework at both the client and the server for the binding negotiation process; and (3) a framework to hook into the client-side runtime system.

The negotiation protocol is a preferably XML-based protocol for supporting a binding negotiation between a client and the service. (XML is described in more detail references 7-8 of Appendix B.) While the negotiation protocol need not use any particular language, it may have these components: (a) a negotiation action and conversation header; (b) negotiation data; and (c) profiles to help the conversation. Preferably, the protocol also has extensibility features to support message extensions. The negotiation action may specify actions like list bindings, select binding, use binding, binding property enumeration, etc. The conversation header may contain correlation information on messages. The negotiation data includes the data for the actions described above. These are the profiles to help binding selection. This can include client/service container information, user-defined requirements and any other information that can help binding selection. The profiles may be in any data format, including binary data. In the case of SOAP, SOAP attachments [12] (which are MIME-type attachments) may be used to send these MIME-based profiles.

The negotiation protocol may define its propagation and usage across intermediaries (as described above) so that the binding selection process is intermediary friendly. It may enable intermediaries to work with the negotiation protocol to select the binding of choice for the communication and allow graceful usage of binding by client and service, for example by allowing the routing of SOAP headers as needed and the routing of messages without affecting the negotiation process.

The binding framework at both the client and the server for the binding negotiation process is capable of initiating a binding selection process at runtime, for example with SOAP messages. SOAP headers may be used for controlling this conversation and for transporting the profiles involved in the conversation. Additional information on the service profiles (e.g., client/service container properties, custom user-defined properties, and class loader information) may be carried along with the message as attachments (e.g., SOAP attachments). All these conversations are effected using the negotiation protocol as stated earlier. Even after the binding selection is done, the client and the server can send this negotiation information through the current binding channel and can initiate a new binding selection process if needed. A framework may be defined to introspect the client- and server-side context information to make appropriate decisions on binding selection.

The client-side framework enables the client to initiate a binding negotiation process with a service before a method call and to cache the selected binding based on specified lifetime requirements. It enables clients to provide the necessary information to the server for the negotiation process. Further, it may define profiles, standards and rules for negotiation and enable a client to renegotiate a binding based on its requirements.

The server-side framework for supporting the service binding negotiation protocol enables a service to support a service binding negotiation process before the service call. It enables the server to determine the QOS requirements of the client (such as contained in a SOAP header) based on the profiles and supporting data (such as contained in SOAP attachments) used for negotiation.

The server-side framework may introspect the server to detect QOS feature requirements and to find out the details on the context in which the service is running. The server-side framework may also introspect the server runtime to validate the client runtime context and introspect the client context information to select the suitable binding. For example, if both the client and the server are using the same class loader, a Java binding should be used.

The framework to hook into the client-side runtime system can be a JAX-RPC handler framework, in the case of Java based services. This allows the client to make a decision on binding selection before the service call dispatch. The transport binding protocol of the present invention allows the client-side framework to change the binding dynamically, dynamically deploying a binding based on the client configuration. This approach is flexible and can be adapted to other Web service environments. Once the binding selection is done, this runtime framework will decide on the scope of this binding selection. The scope can be, application-wide (all service calls), WSDL port type-wide (as prescribed by WSDL binding) or on a per service call basis. Also, the client can control the lifetime of this binding negotiation through custom methods like timers, profiles etc. Also possible is a method a method by which the server can control the binding usage using the same negotiation protocol.

Figure 6:
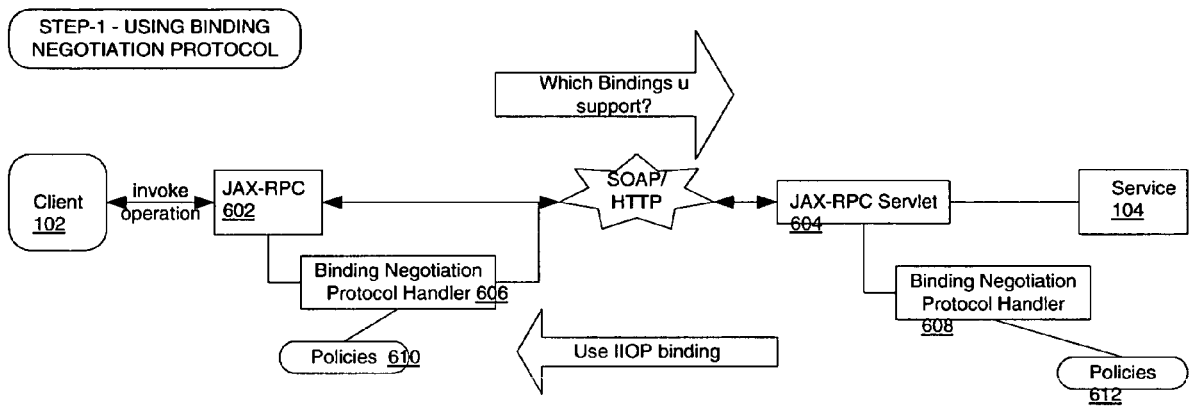
FIG. 6 shows a transport binding negotiation protocol framework.
Figure 7:
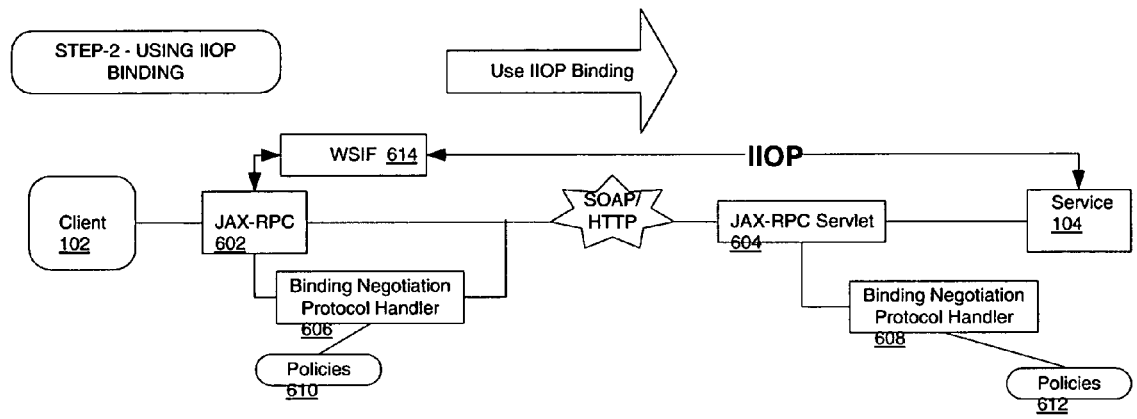
FIG. 7 shows a transport binding negotiation protocol framework using an IIOP binding.

FIGS. 6 and 7 show how this negotiation process takes place at runtime in a preferred embodiment of the invention. As shown in the figures, client 102 interacts with service 104 through a JAX-RPC handler 602 on the client side and a JAX-RPC handler (or servlet) 604 on the server side. (Although JAX-RPC handlers are used in this particular example, the methods of the present invention may be applied to other message handlers, especially SOAP handlers, as well.) JAX-RPC handler 602 handles the service binding negotiation with the assistance of a binding negotiation protocol handler 606 having access to policies 610. Similarly, on the server side, JAX-RPC servlet 604 handles the service binding negotiation with the assistance of a binding negotiation protocol handler 608 with access to policies 612. Relating the elements shown in FIG. 6 to the components described above, binding negotiation protocol handlers 606 and 608 constitute the binding framework on the client side and server side, respectively, and perform the service binding negotiation between themselves using the defined protocol, while JAX-RPC handler 602 constitutes the framework for hooking into the client-side runtime system.

Referring now to FIG. 6, the two-step operation, which the client 102 initiates with a service operation invocation, will now be described. Step 1, the negotiation process using the negotiation binding protocol, starts when the client 102 invokes the two-step operation by signaling the JAX-RPC handler 602. In response, JAX-RPC handler 602 initiates an exchange with JAX-RPC servlet 604 on the server side to determine which service bindings it supports. In this particular example, JAX-RPC servlet 604 signals back that it uses the IIOP binding. (If the JAX-RPC 604 had identified a number of bindings, the JAX-RPC handler 602 would select one in accordance with one or more criteria and optionally, depending on the particular protocol, signal back its selection to the server side.)

Referring now to FIG. 7, in step 2, the actual service invocation, JAX-RPC 602 handler invokes the service 104 using the negotiated binding (here, IIOP). In invoking the service 104, JAX-RPC handler 102 communicates directly with the service 104 using a Web services invocation framework (WSIF) 614 of the type described, for example, in reference [2] at pages 89-99.

Figure 8:
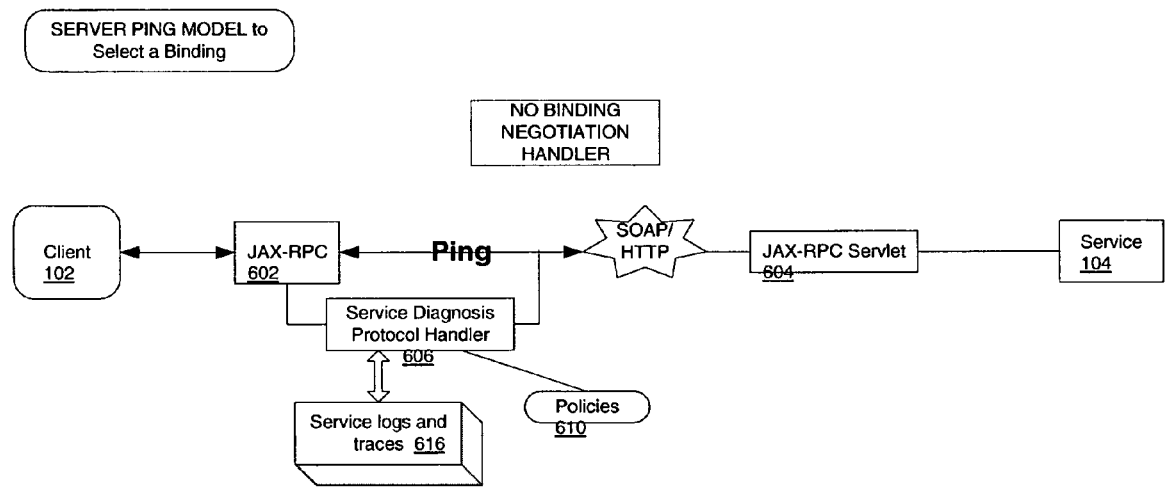
FIG. 8 shows a server diagnosis process to find the best suitable transport binding.

There may be cases where there is no server-side framework to support the negotiation process on binding selection as described above. In this type of situation, the client or client administrator can go through a diagnostic process to find out the best suitable binding based on their requirements (FIGS. 5B and 8). A diagnostic framework for selecting a suitable service binding may have client-side diagnostic handlers for working with the service client runtime framework, diagnostic utilities for collecting detailed data around server debug (including logs, pings and traces), and a binding selection protocol for working on the data collected to get the details on binding performance and throughput. The diagnostic utilities may include correlation logic for selecting a service binding from diagnostic information and may use profiles in the binding selection.

FIG. 8 shows how binding selection (step 1) is achieved through diagnosis in the embodiment shown in FIGS. 6 and 7. In this scenario, JAX-RPC handler 602 pings JAX-RPC servlet 604 on the server side and determines that there is no binding negotiation framework. Having determined this, JAX-RPC handler 602 has protocol handler 606 determine an appropriate binding, based upon policies 612 and service logs and traces 616. After selecting a service binding in this manner, JAX-RPC handler 602 proceeds to step 2, where it operates in the manner shown in FIG. 7.

This diagnostic process can be very extensive and can run over the time before the client can make a decision on the binding to use. A number of diagnostic utilities (server pings, event data, log/trace evaluators, etc) can be generated to work with this model to generate the necessary logs and traces. This diagnostic process becomes a part of the client side service framework and can influence the service call to select the best suitable protocol binding at runtime. In the case of JAX-RPC based systems we are defining a diagnosis handler framework to support this process.

Figure 9:
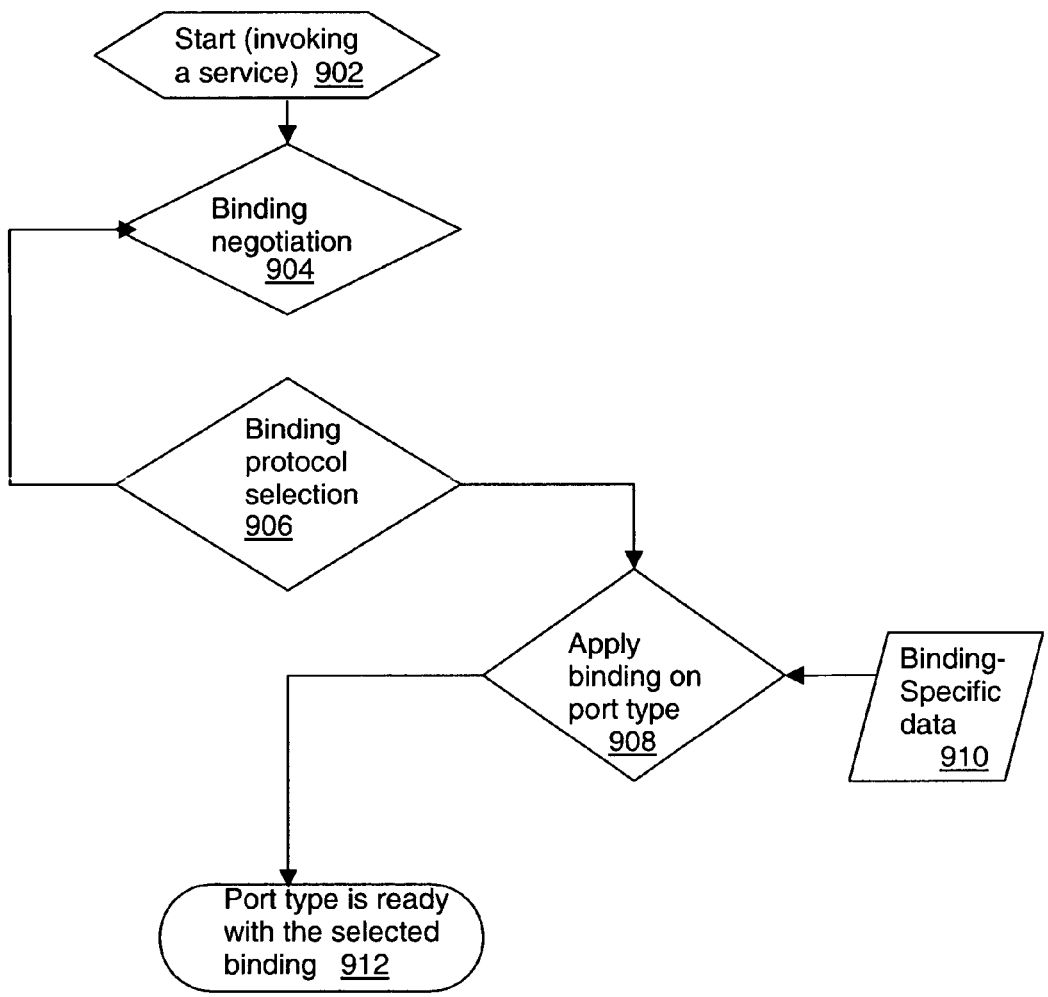
FIG. 9 shows the transport binding selection process for a WSDL port type.

FIG. 9 shows the high-level flow of the transport binding selection process for a WSDL port type. On the invocation of a service call (step 902), first the client and the service go through a transport binding negotiation process (step 904). Based on the binding selection policies and protocol definition as defined by the negotiation protocol, the client can select a binding with the maximum QOS capabilities (step 906). Once the negotiation is done, the client can apply the binding selection information on an application-wide, port type-wide or operation-wide basis, depending on the client's requirements (step 908). The binding can now apply binding-specific properties 910 specified by both WSDL binding elements and by the binding negotiation protocol. The client is now ready to invoke operations using the selected binding (step 912). Over the time the client could change the binding selection by repeating the above steps.

While particular embodiments have been shown and described, various modifications will be apparent to those skilled in the art.

Appendix A: Abbreviations and Acronyms

HTTP Hypertext Transfer Protocol.
IIOP Internet Inter-ORB Protocol.
IPC Interprocess communication
JAX-RPC Java API for XML-based RPC
JMS Java Messaging Service
MIME Multipurpose Internet Mail Extensions
QOS Quality of service.
RDF Resource Description Framework
RMI Remote Method Invocation
RPC Remote procedure call
SLA Service level agreement
SOAP Simple Object Access Protocol.
UDDI Universal Description, Discovery and Integration
WSDL Web Service Definition Language.
WSIF Web Services Invocation Framework
XML Extensible Markup Language Appendix B: Cited References 1. W3C Note, "Web Services Description Language (WSDL) 1.1", Mar. 15, 2001.
2. Ueli Wahli et al., WebSphere Version 5 Web Services Handbook, IBM Redbook, SG24-6891-00, March 2003.
3. W3C Working Draft, "SOAP Version 1.2 Part 0: Primer", Jun. 26, 2002.
4. W3C Working Draft, "SOAP Version 1.2 Part 1: Messaging Framework", Jun. 26, 2002.
5. W3C Working Draft, "SOAP Version 1.2 Part 2: Adjuncts", Jun. 26, 2002.
6. Aaron Skonnard, "Understanding SOAP", MSDN Library, March 2003.
7. W3C Recommendation, "Extensible Markup Language (XML) 1.0 (Second Edition)", Oct. 6, 2000.
8. Peter Flynn (ed.), "The XML FAQ v. 3.01", Jan. 14, 2003.
9. Sun Microsystems, Inc., "Java API for XML-Based RPC (JAX-RPC)", printed Aug. 28, 2003.
10. Ian Foster et a, "The Physiology of the Grid: An Open Grid Services Architecture for Distributed Systems Integration", Jun. 22, 2002.
11. Steve Tuecke et al., "Grid Service Specification", Draft 3, Jul. 17, 2002.
12. W3C Note, "SOAP Messages with Attachments", Dec. 11, 2000.

What is claimed is:

1. In a service-oriented architecture in which a client invokes a Web service from a Web service provider over a communication path between said client and said Web service provider using a dynamically selected transport binding and in which said Web service invocation passes through one or more intermediary nodes along said communication path between said client and said server as end nodes, a method of invoking said Web service comprising the steps of:
    having each pair of adjacent nodes along said communication path between said client and said server negotiate a transport binding for a portion of said Web service invocation from said Web service provider passing between said nodes in a negotiation process over said communication path using a first transport binding between said nodes; and
    having each pair of adjacent nodes conduct subsequent communications between said client and said Web service provider relating to the portion of said Web service invocation over said communication path passing between said nodes using the transport binding negotiated in said negotiation process using said first transport binding between said nodes.

2. The method of claim 1 in which said client is on a client side of said communication path, said steps being performed on said client side of said communication path.

3. The method of claim 1 in which said Web service provider is on a server side of said communication path, said steps being performed on said server side of said communication path.

4. The method of claim 1 in which said client is on a client side of said communication path and said Web service provider is on a server side of said communication path, said steps being performed on said client side and said server side of said communication path.

* * * * *